T. W. WEBB.

Wheel Plow.

No. 85,496.

Patented Dec. 29, 1868.

Witnesses:
Jno. D. Patten.
S. M. Pool.

Inventor:
T. W. Webb.
By atty. A. B. Stoughton

TIMOTHY U. WEBB, OF SPRINGFIELD, ILLINOIS.

Letters Patent No. 85,496, dated December 29, 1868; antedated December 22, 1868.

IMPROVEMENT IN GANG-PLOWS.

The Schedule referred to in these Letters Patent and making part of the same.

*To all whom it may concern:*

Be it known that I, TIMOTHY U. WEBB, of Springfield, in the county of Sangamon, and State of Illinois, have invented a new and useful Improvement in Gang-Plows; and that the following is a full, clear, and exact description of the same, reference being had to the accompanying drawings, making part of this specification, in which—

Similar letters of reference, where they occur in the two figures, denote like parts of the machine.

Figure 1:
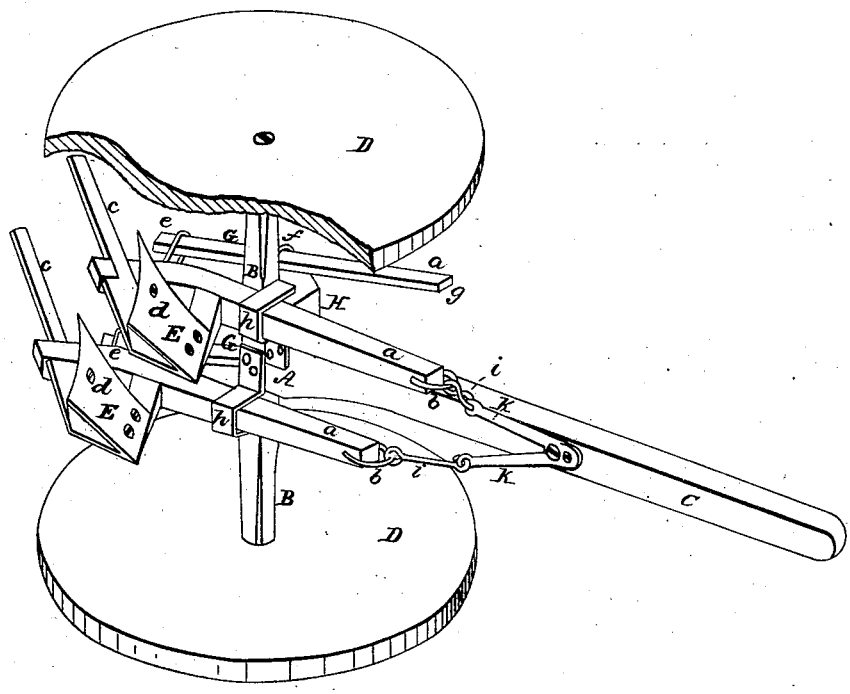
Figure 1 represents a perspective view of the plow lying on its side to exhibit the under parts.
Figure 2:
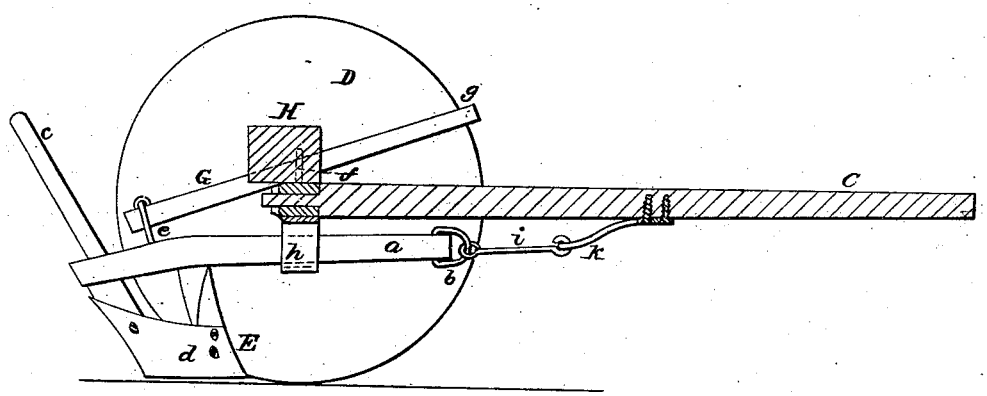
Figure 2 represents a longitudinal section through the plow.

The object of my invention is to construct a gang-plow in such a manner that two or more ordinary plows can be used at one and the same time, with one pair of horses, each plow being linked by a spreader to the tongue of a frame mounted on wheels, and fitting loosely in keepers or bearers under the axle, and controlled by levers so that the depth of the furrow can be regulated at will, and when it is desired to use the plows separate from the frame, the simple shipping off of the clevises frees them from the machine, allowing them to be used singly.

To enable others skilled in the art to make and use my invention, I will proceed to describe the same, with reference to the drawings.

A is the frame, composed substantially of the axle B and tongue C, to which the team is attached in the usual manner.

This frame is mounted on two wheels, D D, which support the axle B.

Two plows, E E, of the ordinary construction, each having a beam, *a*, clevis *b*, handles *c*, and mould-boards *d*, are hung under the axle by a staple *e*, to which is fastened the end of a lever, G.

This lever passes over and is pivoted on the axle, being retained there in position by a staple, *f*, so that the driver can, from his seat H, raise or depress either or both of the plows by operating on the other end, *g*, of the lever G.

The beams *a* of each plow pass under the axle B, through keepers or bearers *h*, which retain the plows at a uniform height and distance apart, equal to the width of the furrow.

The forward end of the beam *a* of each single plow is connected, by means of clevises *b* and links *i i'*, to a forked spreader, *k*, attached on the under side of the tongue C. The link *i'* of the left plow, being longer than the link *i* of the other, allows the left-hand plow to drop behind, a certain distance, so as to permit it to turn a furrow without interfering with the furrow of the right-hand plow.

The advantages of this construction of plow are, that every farmer can have a gang-plow, with but little additional expense, by using in their construction the ordinary plows that he has already on h nd; also, the facility with which each plow can be freed from weeds, corn-stalks, stubble, &c., as it can be raised and lowered by its corresponding lever G, without interfering with the other; and, finally, by dismembering his gang-plow, he can have two or more single plows, each of which is ready to be used at any time when such plows are required. In other words, the farmer may unite his ordinary plows into a gang, and so use them, or separate them and use them singly, as circumstances may require.

Having now fully described my invention,

What I claim therein as new, and desire to secure by Letters Patent, is—

In combination with a frame A, the spreader and bearers, for the purpose of uniting and working as a gang a series of single plows E E, constructed, arranged, and operating substantially in the manner and for the purposes described.

TIMOTHY U. WEBB.

Witnesses:
JOHN P. DOUSMAN,
G. E. T. KYBER.